(12) United States Patent
Jung et al.

(10) Patent No.: US 10,615,448 B2
(45) Date of Patent: Apr. 7, 2020

(54) ELECTRODE ASSEMBLY

(71) Applicant: LG CHEM, LTD., Seoul (KR)

(72) Inventors: Ah Reum Jung, Daejeon (KR); Ji Won Park, Daejeon (KR); Myung Hoon Ko, Daejeon (KR); Seung Ho Na, Daejeon (KR); Jin Ho Ban, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/882,416

(22) Filed: Jan. 29, 2018

(65) Prior Publication Data
US 2018/0159168 A1    Jun. 7, 2018

Related U.S. Application Data

(63) Continuation of application No. 14/547,733, filed on Nov. 19, 2014, now Pat. No. 9,923,230, which is a
(Continued)

(30) Foreign Application Priority Data

Feb. 15, 2013  (KR) .................... 10-2013-0016514
Feb. 17, 2014  (KR) .................... 10-2014-0017716

(51) Int. Cl.
  *H01M 10/04*     (2006.01)
  *H01M 10/0585*   (2010.01)
  *H01M 2/02*      (2006.01)

(52) U.S. Cl.
  CPC ....... *H01M 10/0436* (2013.01); *H01M 10/04* (2013.01); *H01M 10/0413* (2013.01); *H01M 10/0585* (2013.01); *H01M 2002/0205* (2013.01)

(58) Field of Classification Search
  CPC ............. H01M 10/04; H01M 10/0413; H01M 10/0436; H01M 10/0585; H01M 2002/0205
  See application file for complete search history.

(56) References Cited

U.S. PATENT DOCUMENTS 4,020,244 A * 4/1977 Selinko .............. H01M 2/1077
                                                429/100
6,383,234 B1 * 5/2002 Noh .................. H01M 10/0413
                                                29/623.1
(Continued)

FOREIGN PATENT DOCUMENTS

CN   101002347 A   7/2007
CN   101252208 A   8/2008
(Continued)

OTHER PUBLICATIONS

KR 100440934 B1 (Kr1020030066960 publication) machine translation (Year: 2018).*
(Continued)

*Primary Examiner* — Lingwen R Zeng
(74) *Attorney, Agent, or Firm* — Mintz Levin Cohn Ferris Glovsky and Popeo, P.C.; Steven M. Jensen

(57) ABSTRACT

An electrode assembly includes a cell stack part having (a) a structure in which one kind of radical unit having a same number of electrodes and separators alternately disposed and integrally combined is repeatedly disposed, or (b) a structure in which at least two kinds of radical units having a same number of electrodes and separators alternately disposed and integrally combined are disposed in a predetermined order, and a fixing part extending from a top surface along a side to a bottom surface thereof for fixing the cell stack part. The one kind of radical unit has a four-layered structure in which first electrode, first separator, second electrode and second separator are sequentially stacked or a repeating structure in which the four-layered structure is repeatedly stacked, and each of the at least two kinds of radical units are stacked by ones to form the four-layered structure or the repeating structure.

13 Claims, 27 Drawing Sheets

Related U.S. Application Data continuation of application No. PCT/KR2014/001270, filed on Feb. 17, 2014.

(56) References Cited

U.S. PATENT DOCUMENTS

| | | |
|---|---|---|
| 7,384,705 B2 | 6/2008 | Kezuka et al. |
| 2001/0005561 A1 | 6/2001 | Yamada et al. |
| 2002/0160257 A1* | 10/2002 | Lee .................. H01M 6/46 |
| | | 429/130 |
| 2003/0013012 A1 | 1/2003 | Ahn et al. |
| 2003/0113618 A1 | 6/2003 | Xing et al. |
| 2006/0115718 A1* | 6/2006 | Parsian ........... H01M 10/0525 |
| | | 429/152 |
| 2007/0254199 A1 | 11/2007 | Shu et al. |
| 2008/0044689 A1 | 2/2008 | Shu et al. |
| 2008/0305398 A1 | 12/2008 | Komiya |
| 2010/0003590 A1* | 1/2010 | Park .................. H01M 2/1673 |
| | | 429/144 |
| 2010/0190081 A1 | 7/2010 | Park et al. |
| 2011/0104567 A1* | 5/2011 | Lee .................. H01M 2/16 |
| | | 429/211 |
| 2011/0151307 A1 | 6/2011 | Hwang et al. |
| 2011/0223465 A1 | 9/2011 | Kanda |
| 2012/0015236 A1 | 1/2012 | Spare |
| 2012/0121964 A1 | 5/2012 | Park et al. |
| 2012/0196167 A1 | 8/2012 | Kim et al. |
| 2012/0225345 A1 | 9/2012 | Kim |
| 2012/0244423 A1 | 9/2012 | Kusukawa et al. |
| 2012/0308878 A1 | 12/2012 | Sakashita et al. |
| 2014/0134472 A1 | 5/2014 | Kim |

FOREIGN PATENT DOCUMENTS

| | | |
|---|---|---|
| CN | 102884665 A | 1/2013 |
| EP | 2557626 A2 | 2/2013 |
| EP | 2802025 A1 | 11/2014 |
| EP | 2802033 A1 | 11/2014 |
| EP | 2808933 A1 | 12/2014 |
| JP | 2000-311717 A | 11/2000 |
| JP | 2001-28275 A | 1/2001 |
| JP | 2001-167743 A | 6/2001 |
| JP | 2003-523060 A | 7/2003 |
| JP | 2004-47161 A | 2/2004 |
| JP | 2009-540523 A | 11/2009 |
| JP | 2010-80324 A | 4/2010 |
| JP | 2011-129523 A | 6/2011 |
| JP | 2012-248465 A | 12/2012 |
| JP | 2013-25999 A | 2/2013 |
| KR | 10-0440934 B1 | 7/2004 |
| KR | 100440934 B1 * | 7/2004 |
| KR | 10-2004-0082874 A | 9/2004 |
| KR | 10-2006-0092429 A | 8/2006 |
| KR | 10-2008-005629 A | 1/2008 |
| KR | 10-2011-0037781 A | 4/2011 |
| KR | 10-2011-0112241 A | 10/2011 |
| TW | 499767 B | 8/2002 |
| TW | 200743245 A | 11/2007 |
| TW | 200812138 A | 3/2008 |
| TW | I344234 B | 6/2011 |
| WO | WO 2006/025662 A1 | 3/2006 |
| WO | WO 2008/002024 A1 | 1/2008 |
| WO | WO 2010/113273 A1 | 10/2010 |

OTHER PUBLICATIONS

International Search Report issued in PCT/KR2014/001270, dated May 20, 2014.
Chinese Office Action and Search Report for Chinese Application No. 201480001846.5, dated Mar. 18, 2016, with an English translation.
Extended European Search Report dated Sep. 2, 2015, for European Application No. 14752127.2.
KR10-0440934 B1 (KR 10-2003-0066960 Publication) Machine Translation.

\* cited by examiner

ELECTRODE ASSEMBLY

CROSS-REFERENCE TO RELATED APPLICATIONS

This application is a Continuation of U.S. application Ser. No. 14/547,733, filed Nov. 19, 2014, which is a continuation of PCT International Application No. PCT/KR2014/001270, filed on Feb. 17, 2014, which claims priority under 35 U.S.C. 119(a) to Patent Application No. 10-2013-0016514, filed in the Republic of Korea on Feb. 15, 2013, and to Patent Application No. 10-2014-0017716, filed in the Republic of Korea on Feb. 17, 2014, all of which are hereby expressly incorporated by reference into the present application.

TECHNICAL FIELD

The present invention relates to an electrode assembly, and more particularly, to an electrode assembly having good stacking stability that may be realized through stacking.

BACKGROUND ART

Secondary batteries may be classified into various types according to the structure of an electrode assembly. Typically, secondary batteries may be classified into a stack-type, a wrapping-type (a jelly-roll type), or a stack/folding type according to the structure of an electrode assembly. The stack-type structure may be obtained by separately stacking electrode units (a cathode, a separator, and an anode) constituting the electrode assembly, and thus an accurate alignment of the electrode assembly is very difficult. In addition, a large number of processes are necessary for the manufacture of the electrode assembly. The stack/folding type structure is generally manufactured by using two lamination apparatuses and one folding apparatus, and thus the manufacture of the electrode assembly is very complicated. Particularly, in the stack/folding type structure, full cells or bi-cells are stacked through folding, and thus the alignment of the full cells or the bi-cells is difficult.

SUMMARY OF THE INVENTION

The applicant of the present disclosure has been filed a novel type electrode assembly that may be manufactured only by stacking and that may be accurately aligned with improved productivity. The present disclosure basically relates to the electrode assembly having improved stacking stability.

An aspect of the present disclosure provides an electrode assembly that may be realized by stacking and has good stacking stability.

According to an aspect of the present disclosure, there is provided an electrode assembly including a cell stack part having (a) a structure in which one kind of radical unit is repeatedly disposed, the one kind of radical unit having a same number of electrodes and separators which are alternately disposed and integrally combined, or (b) a structure in which at least two kinds of radical units are disposed in a predetermined order, the at least two kinds of radical units each having a same number of electrodes and separators which are alternately disposed and integrally combined, and a fixing part extending from a top surface of the cell stack part along a side of the cell stack part to a bottom surface of the cell stack part for fixing the cell stack part. The one kind of radical unit of (a) has a four-layered structure in which a first electrode, a first separator, a second electrode and a second separator are sequentially stacked together or a repeating structure in which the four-layered structure is repeatedly stacked, and wherein each of the at least two kinds of radical units are stacked by ones in the predetermined order to form the four-layered structure or the repeating structure in which the four-layered structure is repeatedly stacked.

In an electrode assembly according to the present disclosure, since a cell stack part has a structure based on stacking, and a fixing part fixes the cell stack part, the electrode assembly may be easily realized by stacking and has good stacking stability.

DETAILED DESCRIPTION OF THE INVENTION

Exemplary embodiments of the present disclosure will now be described in detail with reference to the accompanying drawings. However, the present disclosure is not restricted or limited to the following exemplary embodiments.

The electrode assembly according to the present disclosure basically includes a cell stack part and a fixing part for fixing the cell stack part. Hereinafter, the cell stack part will be explained first and then, the fixing part will be explained.
Cell Stack Part The cell stack part has a structure obtained by repeatedly disposing one kind of radical units or a structure obtained by disposing at least two kinds of radical units in a predetermined order, for example, alternately. This will be described below in more detail.
[Structure of Radical Unit]

Figure 1:
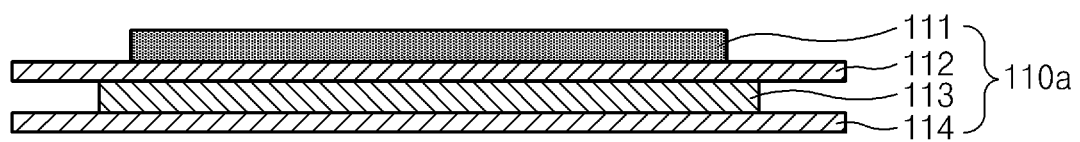
FIG. 1 is a side view illustrating a first structure of a radical unit according to the present disclosure.

In an electrode assembly according to the present disclosure, a radical unit is formed by alternately disposing electrodes and separators. Here, the same number of electrodes and separators are disposed. For example, as illustrated in FIG. 1 a radical unit 110a may be formed by stacking two electrodes 111 and 113 and two separators 112 and 114. Here, a cathode and an anode may naturally face each other through the separator. When the radical unit is formed as described above, an electrode 111 is positioned at one end of the radical unit (see the electrode 111 in FIGS. 1 and 2) and a separator 114 is positioned at the other end of the radical unit (see the separator 114 in FIGS. 1 and 2).

The electrode assembly according to the present disclosure is basically characterized in that the cell stack part or electrode assembly is formed by only stacking the radical units. That is, the present disclosure has a basic characteristic in that the cell stack part is formed by repeatedly stacking one kind of radical unit or by stacking at least two kinds of radical units in a predetermined order. To realize the above-described characteristic, the radical unit may have the following structure.

Figure 2:
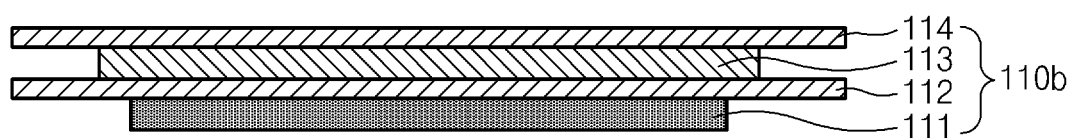
FIG. 2 is a side view illustrating a second structure of a radical unit according to the present disclosure.

First, the radical unit may be formed by stacking a first electrode, a first separator, a second electrode, and a second separator in sequence. In more detail, a first electrode 111, a first separator 112, a second electrode 113, and a second separator 114 may be stacked in sequence from an upper side to a lower side, as illustrated in FIG. 1, or from the lower side to the upper side, as illustrated in FIG. 2, to form radical units 110a and 110b. The radical unit having the above-described structure may be referred to as a first radical unit. Here, the first electrode 111 and the second electrode 113 may be opposite types of electrodes. For example, when the first electrode 111 is a cathode, the second electrode 113 may be an anode.

Figure 3:
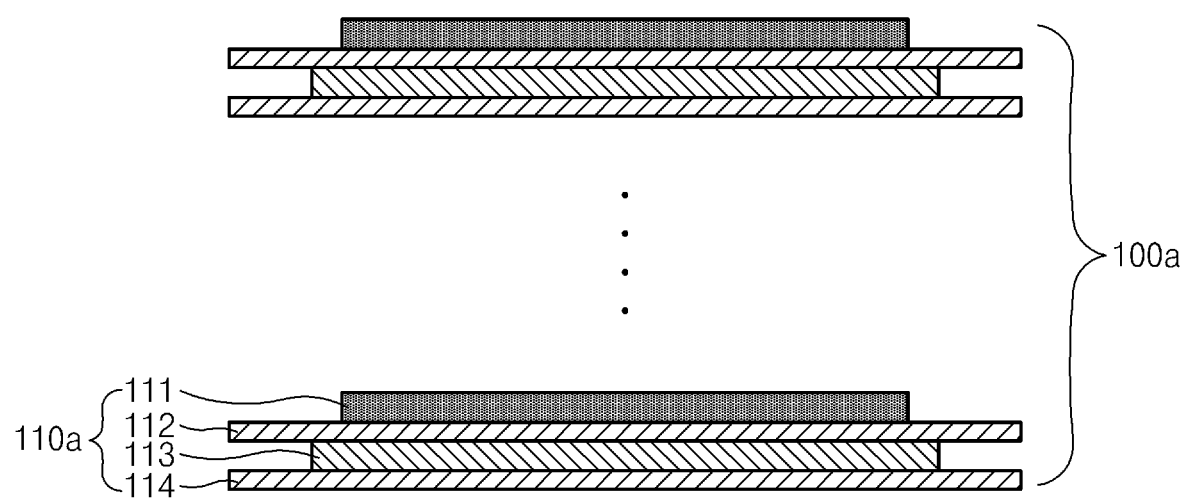
FIG. 3 is a side view illustrating a cell stack part formed by stacking the radical units of FIG. 1.

As described above, the radical unit may be formed by stacking the first electrode 111, the first separator 112, the second electrode 113, and the second separator 114 in sequence. Then, a cell stack part 100a may be formed by only repeatedly stacking the one kind of radical units 110a as illustrated in FIG. 3. Here, the radical unit may have an eight-layered structure or twelve-layered structure in addition to a four-layered structure. That is, the radical unit may have a repeating structure in which the four-layered structure is repeatedly disposed. For example, the radical unit may be formed by stacking the first electrode 111, the first separator 112, the second electrode 113, the second separator 114, the first electrode 111, the first separator 112, the second electrode 113, and the second separator 114 in sequence.

Alternatively, the radical unit may be formed by stacking the first electrode 111, the first separator 112, the second electrode 113, the second separator 114, the first electrode 111, and the first separator 112 in sequence, or by stacking the second electrode 113, the second separator 114, the first electrode 111, the first separator 112, the second electrode 113, and the second separator 114 in sequence. The radical unit having the former structure may be referred to as a second radical unit and the radical unit having the latter structure may be referred to as a third radical unit.

Figure 4:
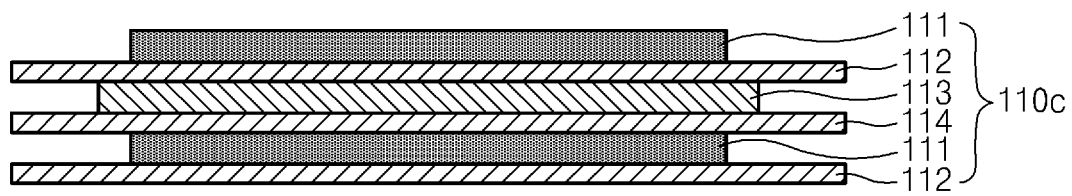
FIG. 4 is a side view illustrating a third structure of a radical unit according to the present disclosure.
Figure 5:
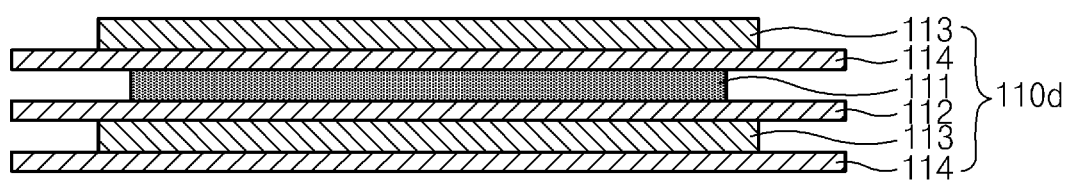
FIG. 5 is a side view illustrating a fourth structure of a radical unit according to the present disclosure.

In more detail, the second radical unit 100c may be formed by stacking the first electrode 111, the first separator 112, the second electrode 113, the second separator 114, the first electrode 111, and the first separator 112 in sequence from the upper side to the lower side, as illustrated in FIG. 4. Also, the third radical structure 110d may be formed by stacking the second electrode 113, the second separator 114, the first electrode 111, the first separator 112, the second electrode 113, and the second separator 114 in sequence from the upper side to the lower side, as illustrated in FIG. 5. As noted above, the stacking may be conducted in sequence from the lower side to the upper side.

Figure 6:
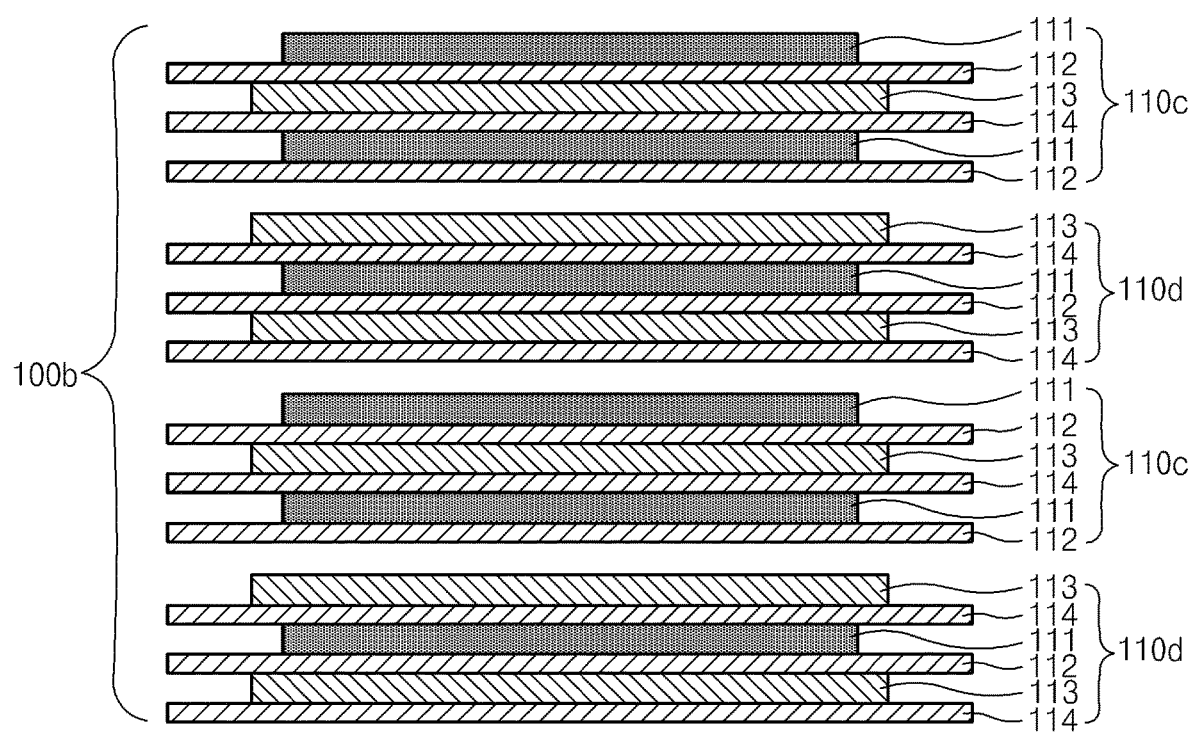
FIG. 6 is a side view illustrating a cell stack part formed by stacking the radical units of FIG. 4 and the radical units of FIG. 5.

When only one of the second radical units 110c and one of the third radical units 110d are stacked, a repeating structure in which the four-layered structure is repeatedly stacked may be formed. Thus, when the second radical unit 110c and the third radical unit 110d are alternately stacked one by one, the cell stack part 100b may be formed by stacking only the second and third radical units, as illustrated in FIG. 6. For reference, when three kinds of radical units are prepared, the cell stack part may be formed by stacking the radical units in a predetermined order, for example, the first radical unit, the second radical unit, the third radical unit, the first radical unit again, the second radical unit, and the third radical unit.

As described above, the one kind of radical unit in the present disclosure has a four-layered structure in which a first electrode, a first separator, a second electrode and a second separator are sequentially stacked, or has a repeating structure in which the four-layered structure is repeatedly stacked. Also, at least two kinds of radical units in the present disclosure are stacked only by ones in a predetermined order to form the four-layered structure or the repeating structure in which the four-layered structure is repeatedly disposed. For example, the first radical unit forms a four-layered structure by itself, and the second radical unit and the third radical unit form a twelve-layered structure by stacking one of each, that is, two radical units in total.

Thus, the cell stack part or electrode assembly may be formed only by stacking, that is, by repeatedly stacking one kind of radical unit or by stacking at least two kinds of radical units in a predetermined order.

The cell stack part of the present disclosure may be formed by stacking the radical units one by one. That is, the cell stack part may be manufactured by forming the radical units and then stacking the radical units repeatedly or in a predetermined order. As described above, the cell stack part of the present disclosure may be formed by only stacking the radical units. Therefore, the radical units of the present disclosure may be very accurately aligned. When the radical unit is accurately aligned, the electrode and the separator may also be accurately aligned in the cell stack part. In addition, the cell stack part or electrode assembly may be improved in productivity. This is done because the manufacturing process is very simple.

[Manufacture of Radical Unit]

Figure 7:
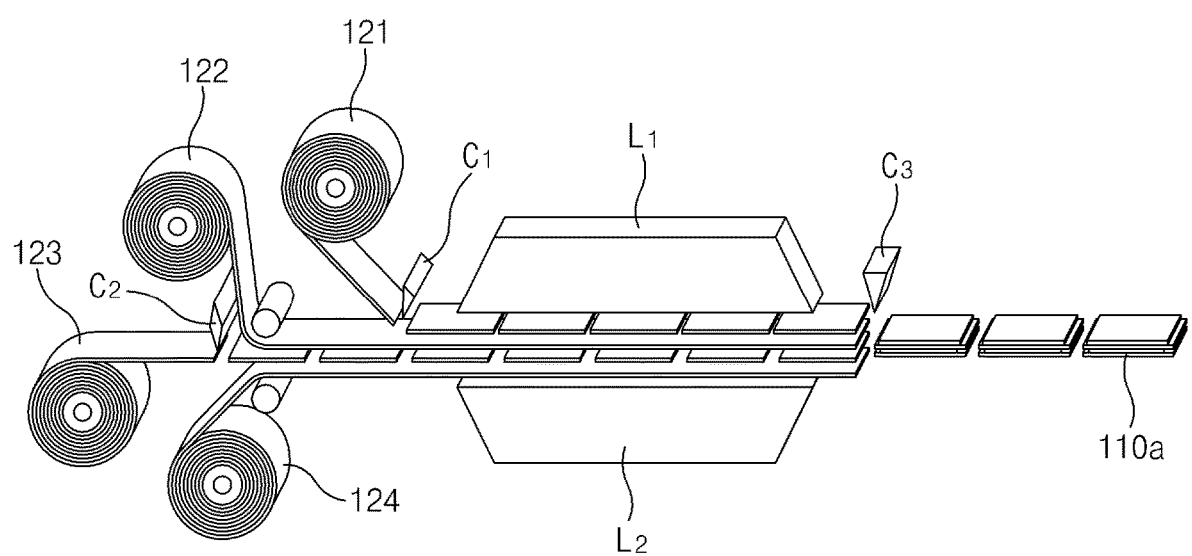
FIG. 7 is a process diagram illustrating a manufacturing process of a radical unit according to the present disclosure.

A manufacturing process of the first radical unit will be exemplarily described with reference to FIG. 7. First, a first electrode material 121, a first separator material 122, a second electrode material 123 and a second separator material 124 are prepared. Here, the first separator material 122 and the second separator material 124 may be the same. The first electrode material 121 is cut into a certain size through a cutter C1, and the second electrode material 123 is cut into a certain size through a cutter C2. Then, the first electrode material 121 is stacked on the first separator material 122, and the second electrode material 123 is stacked on the second separator material 124.

Then, it is preferable that the electrode materials and the separator materials are attached to each other through laminators L1 and L2. Through the attachment, a radical unit in which the electrodes and the separators are integrally combined may be formed. The combining method may be diverse. The laminators L1 and L2 may apply pressure to the materials or apply pressure and heat to the materials to attach the materials to each other. Because of the attachment, the stacking of the radical units may be more easily performed while manufacturing the cell stack part. Also, the alignment of the radical units may be also easily accomplished because of the attachment. After the attachment, the first separator material 122 and the second separator material 124 are cut into a certain size through a cutter C3 to manufacture the radical unit 110a. During this process, the edges of the separators are not joined with each other.

As described above, the electrode may be attached to the adjacent separator in the radical unit. Alternatively, the separator may be attached to the adjacent electrode. Here, it is preferable that an entire surface of the electrode facing the adjacent separator is attached to the adjacent separator. In this case, the electrode may be stably fixed to the separator. Typically, the electrode has a size less than that of the separator.

For this, an adhesive may be applied to the separator. However, when the adhesive is used, it is necessary to apply the adhesive over an adhesion surface of the separator in a mesh or dot shape. This is because if the adhesive is closely applied to the entire adhesion surface, reactive ions such as lithium ions may not pass through the separator. Thus, when the adhesive is used, it is difficult to allow the overall surface of the electrode to closely attach to the adjacent separator.

Alternatively, use of the separator including the coating layer having adhesive strength makes it possible to generally attach the electrode to the separator. This will be described below in more detail. The separator may include a porous separator base material such as a polyolefin-based separator base material and a porous coating layer that is generally applied to one side or both sides of the separator base material. Here, the coating layer may be formed of a mixture of inorganic particles and a binder polymer that binds and fixes the inorganic particles to each other.

Here, the inorganic particles may improve thermal stability of the separator. That is, the inorganic particles may prevent the separator from being contracted at a high temperature. In addition, the binder polymer may fix the inorganic particles to improve mechanical stability of the separator. Also, the binder polymer may attach the electrode to the separator. Since the binder polymer is generally distributed in the coating layer, the electrode may closely adhere to the entire adhesion surface of the separator, unlike the foregoing adhesive. Thus, when the separator is used as described above, the electrode may be more stably fixed to the separator. To enhance the adhesion, the above-described laminators may be used.

The inorganic particles may have a densely packed structure to form interstitial volumes between the inorganic particles over the overall coating layer. Here, a pore structure may be formed in the coating layer by the interstitial volumes that are defined by the inorganic particles. Due to the pore structure, even though the coating layer is formed on the separator, the lithium ions may smoothly pass through the separator. For reference, the interstitial volume defined by the inorganic particles may be blocked by the binder polymer according to a position thereof.

Here, the densely packed structure may be explained as a structure in which gravels are contained in a glass bottle. Thus, when the inorganic particles form the densely packed structure, the interstitial volumes between the inorganic particles are not locally formed in the coating layer, but generally formed in the coating layer. As a result, when each of the inorganic particles increases in size, the pore formed by the interstitial volume also increases in size. Due the above-described densely packed structure, the lithium ions may smoothly pass through the separator over the entire surface of the separator.

The radical units may also adhere to each other in the cell stack part. For example, if the adhesive or the above-described coating layer is applied to a bottom surface of the second separator 114 in FIG. 1, the other radical unit may adhere to the bottom surface of the second separator 114.

Here, the adhesive strength between the electrode and the separator in the radical unit may be greater than that between the radical units in the cell stack part. It is understood, that the adhesive strength between the radical units may not be provided. In this case, when the electrode assembly or the cell stack part is disassembled, the electrode assembly may be separated into the radical units due to a difference in the adhesive strength. For reference, the adhesive strength may be expressed as delamination strength. For example, the adhesive strength between the electrode and the separator may be expressed as a force required for separating the electrode from the separator. In this manner, the radical unit may not be bonded to the adjacent radical unit in the cell stack part, or may be bonded to the adjacent radical unit in the cell stack part by means of a bonding strength differing from a bonding strength between the electrode and the separator.

For reference, when the separator includes the above-described coating layer, it is not preferable to perform ultrasonic welding on the separator. Typically, the separator has a size greater than that of the electrode. Thus, there may be an attempt to bond the edge of the first separator 112 to the edge of the second separator 114 through the ultrasonic welding. Here, it is necessary to directly press an object to be welded through a horn in the ultrasonic welding. However, when the edge of the separator is directly pressed through the horn, the separator may adhere to the horn due to the coating layer having the adhesive strength. As a result, the welding apparatus may be broken down.

[Modification of Radical Unit]

Until now, the radical units having the same size have been explained. However, the radical units may have different sizes. When stacking the radical units having different sizes, cell stack parts having various shapes may be manufactured. Herein, the size of the radical unit is explained with reference to the size of the separator, because, typically, the separator is larger than the electrode.

Figure 8:
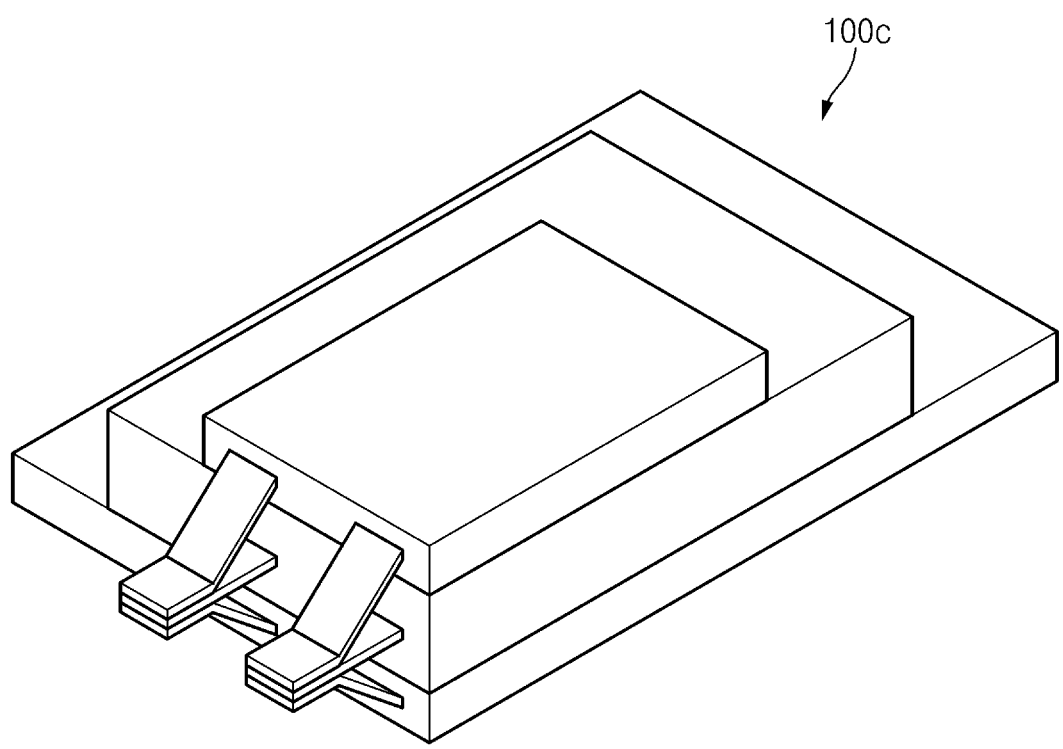
FIG. 8 is a perspective view illustrating a cell stack part formed by stacking radical units having different sizes.
Figure 9:
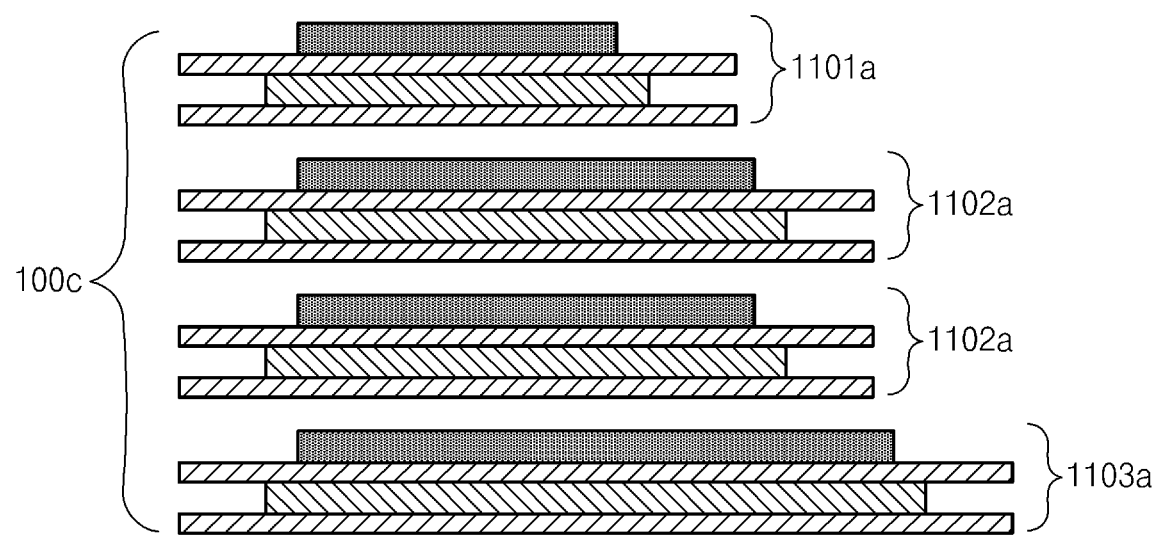
FIG. 9 is a side view illustrating the cell stack part of FIG. 8.

Referring to FIGS. 8 and 9, a plurality of radical units is prepared and may be classified into at least two groups having different sizes (see reference numerals 1101a, 1102a and 1103a in FIG. 9). By stacking the radical units according to their sizes, a cell stack part 100c having a structure of a plurality of steps may be formed. FIGS. 8 and 9 illustrate an embodiment in which the cell stack part includes three steps obtained by stacking the radical units 1101a, 1102a and 1103a classified into three groups, in which the radical units having the same size are stacked together, is illustrated. Therefore, the cell stack part 100c in FIGS. 8 and 9 has a structure including three steps. For reference, the radical units included in one group may form two or more steps.

When the plurality of steps is formed as described above, it is preferable that the radical unit has a structure of the first radical unit, that is, the above-described four-layered structure or the repeating structure in which the four-layered structure is repeatedly stacked. (Herein, the radical units are considered to be included in one kind of radical unit even though the radical units have the same stacked structures but have different sizes.)

Preferably, the same number of cathodes and the anodes are stacked in one step. Also, it is preferable that opposite electrodes face each other through a separator between one step and another step. For example, in case of the second and third radical units, two kinds of the radical units are necessary for forming one step.

However, in case of the first radical unit, only one kind of radical unit is necessary for forming one step as illustrated in FIG. 9. Thus, when the radical unit has the four-layered structure or the repeating structure in which the four-layered structure is repeatedly stacked, number of kinds of radical units may decrease even though a plurality of the steps is formed.

Also, in case of the second and the third radical units, at least one of the two kinds of the radical units are necessary to be stacked to form one step. Thus, the one step may have at least a twelve-layered structure. However, in case of the first radical unit, only one kind of radical unit is necessary to be stacked to form one step. Thus, one step may have at least a four-layered structure. As a result, when the radical unit has the four-layered structure or the repeating structure in which the four-layered structure is repeatedly stacked, the thickness of each step may be easily controlled when forming a plurality of steps.

Figure 10:
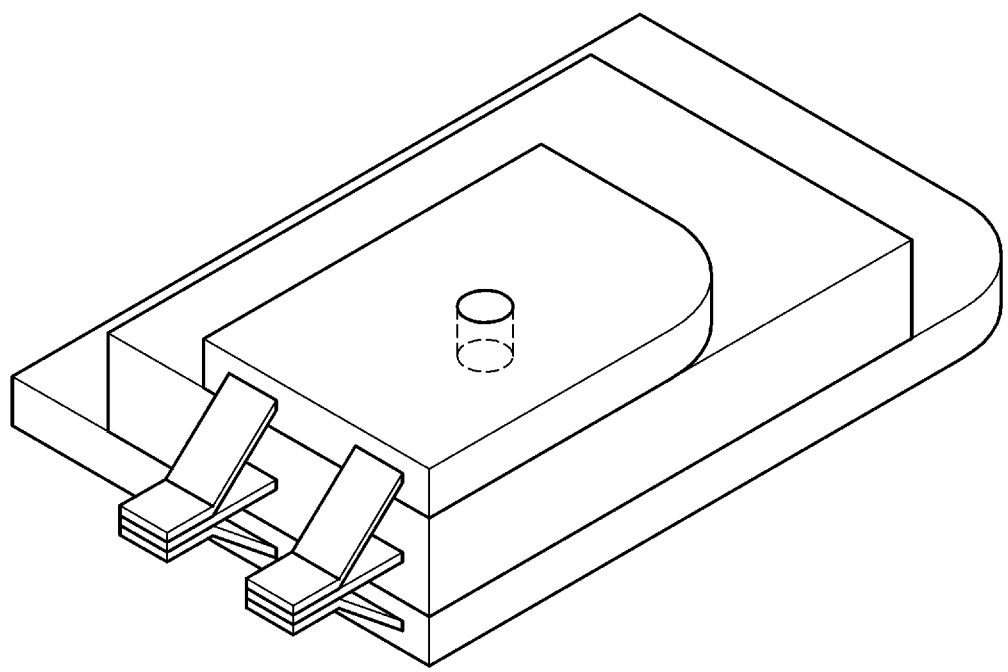
FIG. 10 is a perspective view illustrating a cell stack part formed by stacking radical units having different geometric shapes.

The radical units may have not only different sizes but also different geometric shapes. For example, the radical units may have different sizes and different edge shapes, and may or may not have a through hole as illustrated in FIG. 10. More particularly, as illustrated in FIG. 10, a plurality of radical units classified into three groups may form three steps by stacking the radical units having the same geometric shapes.

For this, the radical units may be classified into at least two groups (each of the groups has different geometric shape). Similarly, the radical unit may preferably have the four-layered structure or the repeating structure in which the four-layered structures are repeatedly stacked, that is, the structure of the first radical unit. (Herein, the radical units are considered to be included in one kind of radical unit even though the radical units have the same stacked structure but have different geometric shapes.)

[Auxiliary Unit]

The cell stack part may further include at least one of a first auxiliary unit and/or a second auxiliary unit. First, the first auxiliary unit will be described below. In the present disclosure, an electrode is positioned at one end of the radical unit, and a separator is positioned at the other end of the radical unit. When the radical units are stacked in sequence, the electrode may be positioned at the uppermost portion or at the lowermost portion of the cell stack part (see reference numeral 116 in FIG. 11, and this electrode may be referred to as a terminal electrode 116). The first auxiliary unit is additionally stacked on the terminal electrode.

Figure 11:
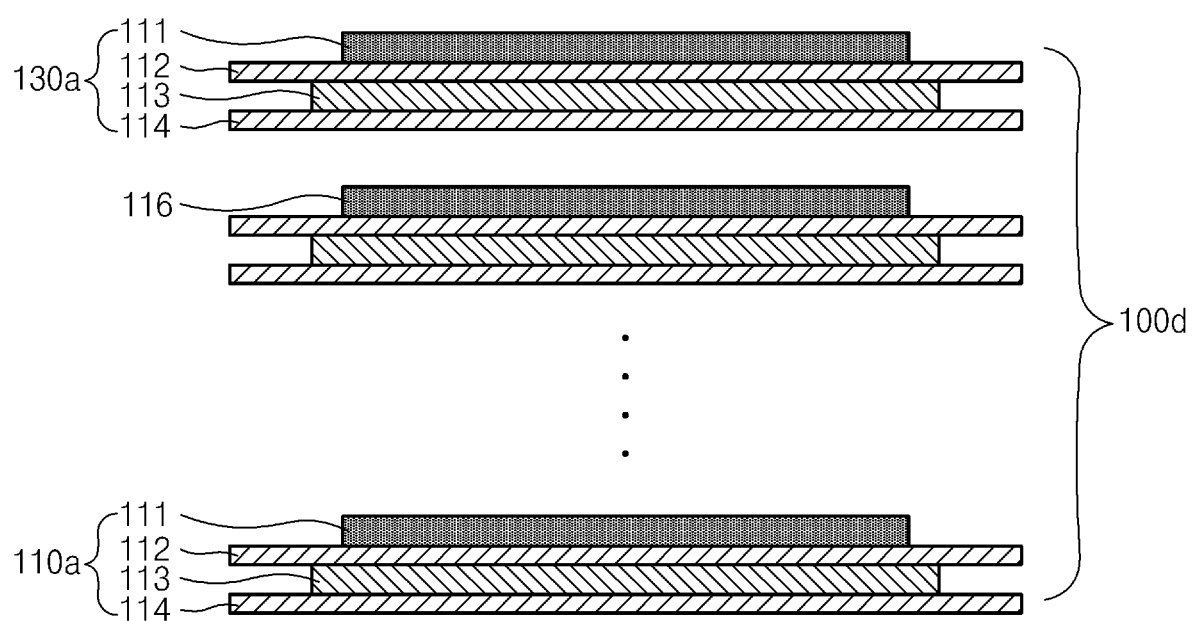
FIG. 11 is a side view illustrating a first structure of a cell stack part including a radical unit and a first auxiliary unit according to the present disclosure.

In more detail, when the terminal electrode 116 is a cathode, the first auxiliary unit 130a may be formed by stacking outward from the terminal electrode 116, a separator 114, an anode 113, a separator 112, and a cathode 111 in sequence, as illustrated in FIG. 11. On the other hand, when the terminal electrode 116 is an anode, the first auxiliary unit 130b may be formed by stacking outward from the terminal electrode 116, the separator 114, and the cathode 113 in sequence, as illustrated in FIG. 12.

Figure 12:
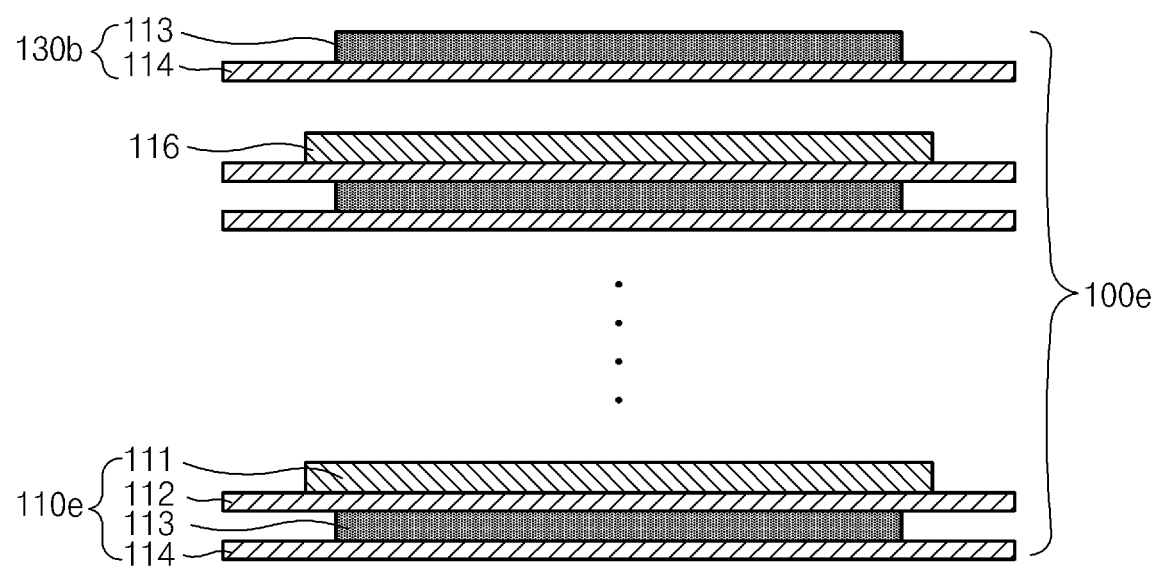
FIG. 12 is a side view illustrating a second structure of a cell stack part including a radical unit and a first auxiliary unit according to the present disclosure.

In the cell stack parts 100d and 100e, a cathode may be positioned at the outermost portion through the first auxiliary units 130a and 130b, as illustrated in FIGS. 11 and 12. In this case, in the cathode positioned at the outermost portion, that is, the cathode of the first auxiliary unit, an active material layer is preferably coated on only one side facing the radical unit (one side facing downward in FIG. 11) among both sides of the current collector. When the one side of the current collector is coated with the active material layer as described above, the active material layer is not positioned at the outermost portion of the cell stack part. Thus, waste of the active material layer may be prevented. For reference, since the cathode emits, for example, lithium ions, when the cathode is positioned at the outermost portion, the capacity of a battery may be improved.

Next, a second auxiliary unit will be described below. The second auxiliary unit performs the same function as the first auxiliary unit, which will be described below in more detail. In the present disclosure, an electrode is positioned at one end of the radical unit, and a separator is positioned at the other end of the radical unit. When the radical units are stacked in sequence, the separator may be positioned at the uppermost portion or at the lowermost portion of the cell stack part (see reference numeral 117 in FIG. 13, and this separator may be referred to as a terminal separator 117). The second auxiliary unit is additionally stacked on the terminal separator.

Figure 13:
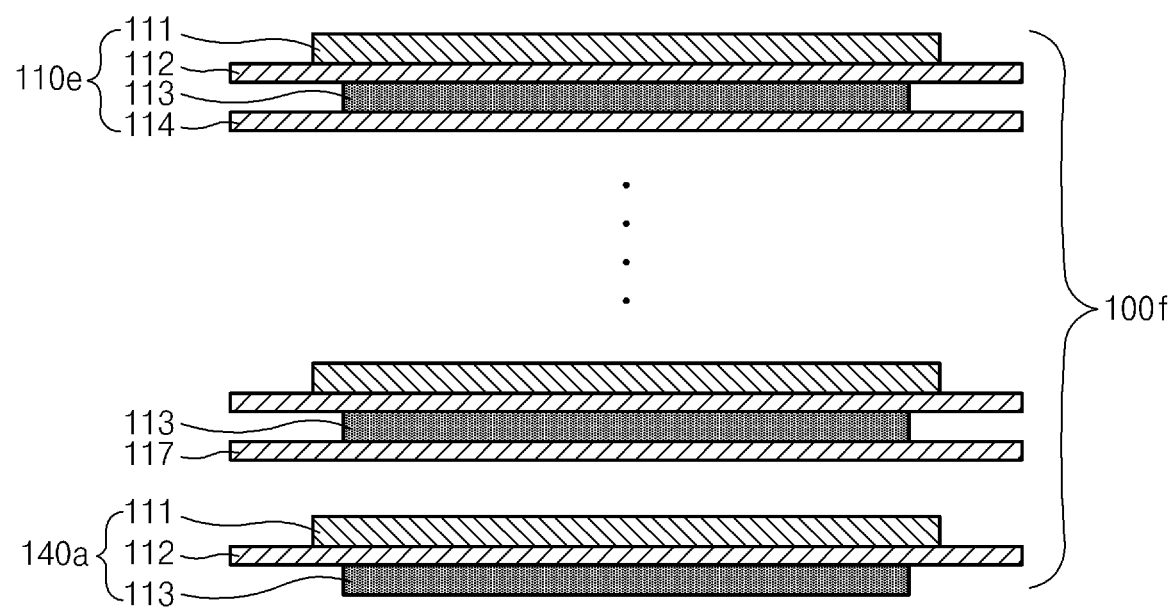
FIG. 13 is a side view illustrating a third structure of a cell stack part including a radical unit and a second auxiliary unit according to the present disclosure.

In more detail, when the electrode 113 contacting the terminal separator 117 is a cathode in the radical unit, the second auxiliary unit 140*a* may be formed by stacking from the terminal separator 117, an anode 111, a separator 112, and a cathode 113 in sequence, as illustrated in FIG. 13. On the other hand, when the electrode 113 contacting the terminal separator 117 is an anode in the radical unit, the second auxiliary unit 140*b* may be formed as the cathode 111, as illustrated in FIG. 14.

Figure 14:
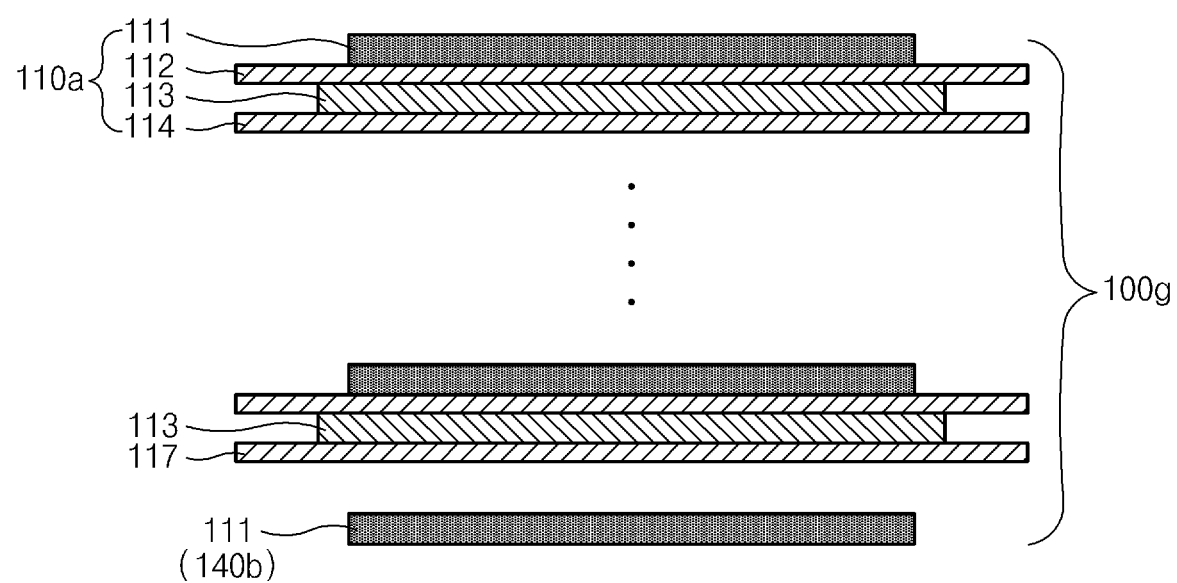
FIG. 14 is a side view illustrating a fourth structure of a cell stack part including a radical unit and a second auxiliary unit according to the present disclosure.

In the cell stack parts 100*f* and 100*g*, a cathode may be positioned at the outermost portion of the terminal separator through the second auxiliary units 140*a* and 140*b*, as illustrated in FIGS. 13 and 14. In this case, in the cathode positioned at the outermost portion, that is, the cathode of the second auxiliary unit, an active material layer is preferably coated on only one side facing the radical unit (one side facing upward in FIG. 13) among both sides of the current collector, as similar to the cathode of the first auxiliary unit.

Figure 15:
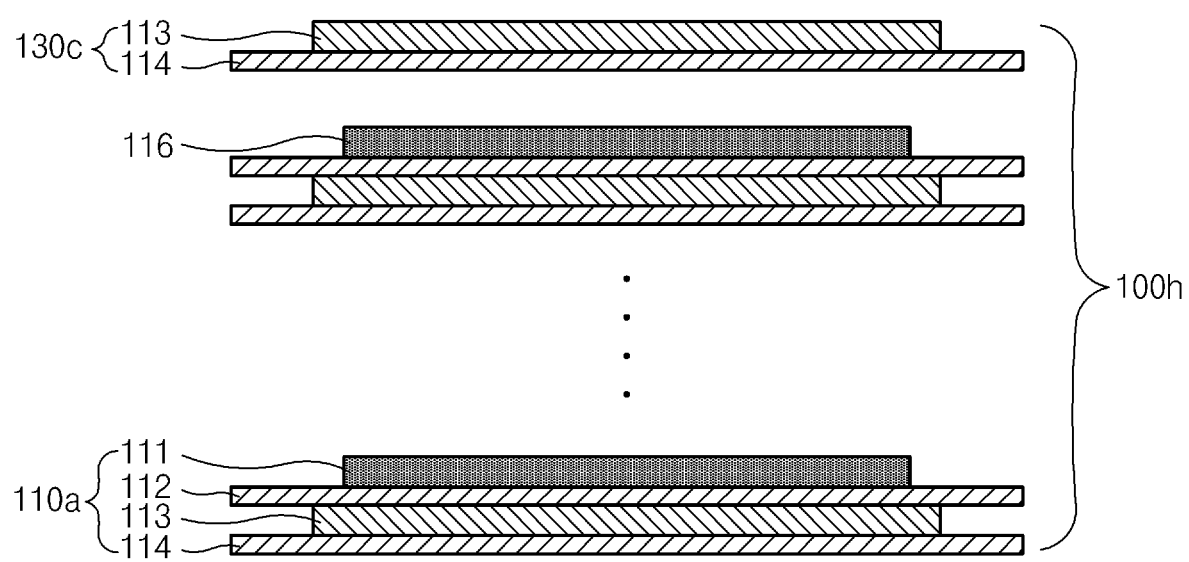
FIG. 15 is a side view illustrating a fifth structure of a cell stack part including a radical unit and a first auxiliary unit according to the present disclosure.

The first auxiliary unit and the second auxiliary unit may have different structures from those described above. First, the first auxiliary unit will be described below. When the terminal electrode 116 is a cathode as illustrated in FIG. 15, the first auxiliary unit 130*c* may be formed by stacking from the terminal electrode 116, a separator 114, and an anode 113 in sequence. On the other hand, when the terminal electrode 116 is an anode as illustrated in FIG. 16, the first auxiliary unit 130*d* may be formed by stacking from the terminal electrode 116, a separator 114, a cathode 113, a separator 112, and an anode 111 in sequence.

Figure 16:
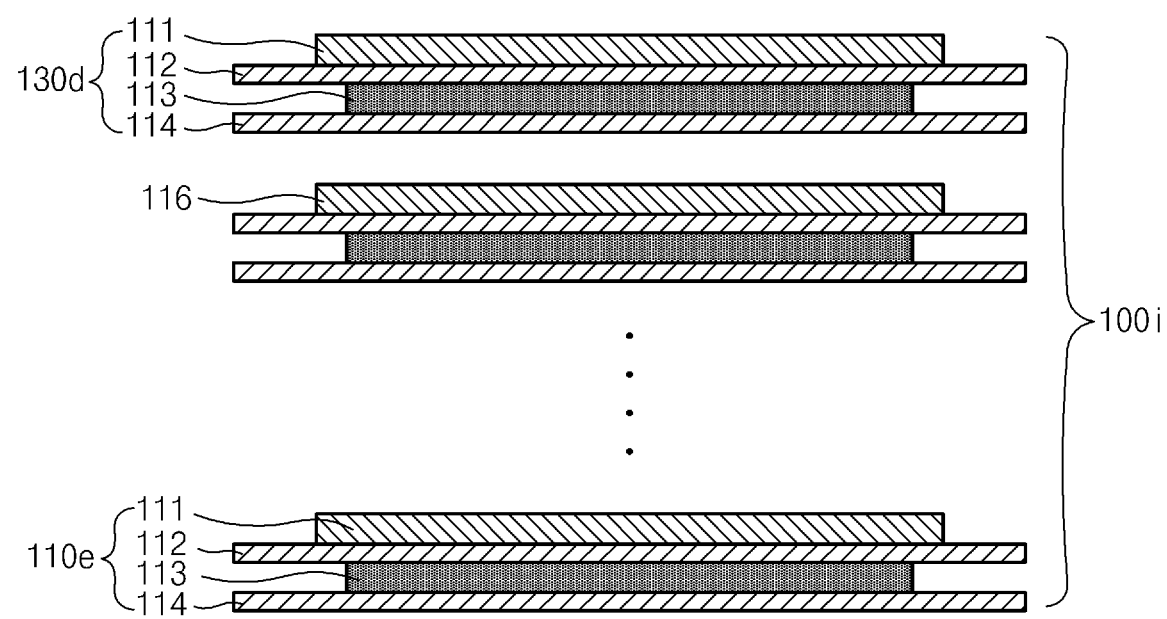
FIG. 16 is a side view illustrating a sixth structure of a cell stack part including a radical unit and a first auxiliary unit according to the present disclosure.

In the cell stack parts 100*h* and 100*i*, the anode may be positioned at the outermost portion of the terminal electrode through the first auxiliary units 130*c* and 130*d* as illustrated in FIGS. 15 and 16.

Figure 17:
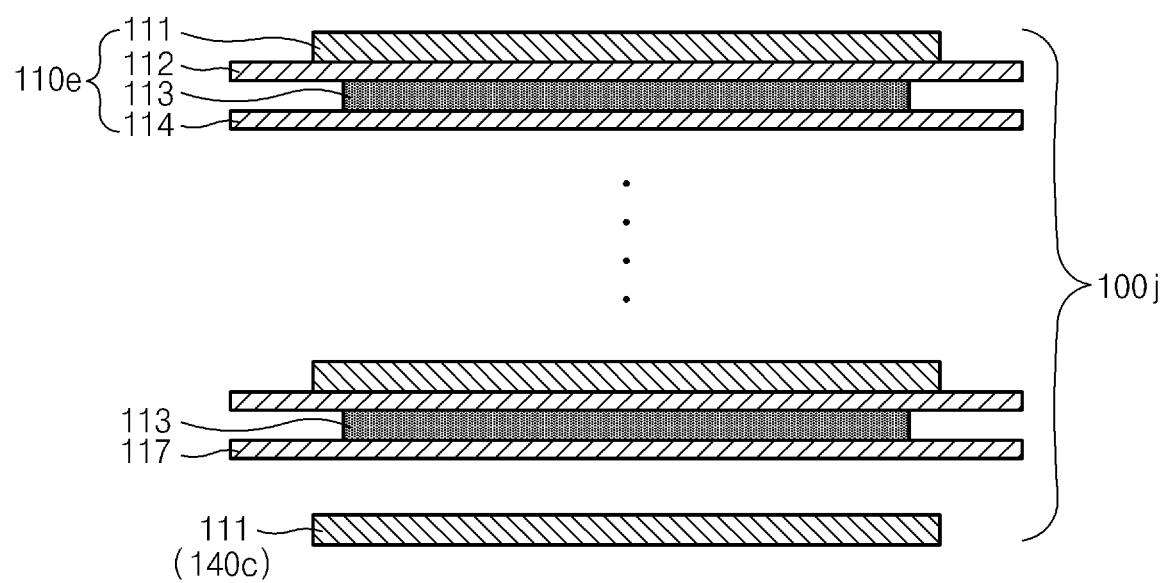
FIG. 17 is a side view illustrating a seventh structure of a cell stack part including a radical unit and a second auxiliary unit according to the present disclosure.
Figure 18:
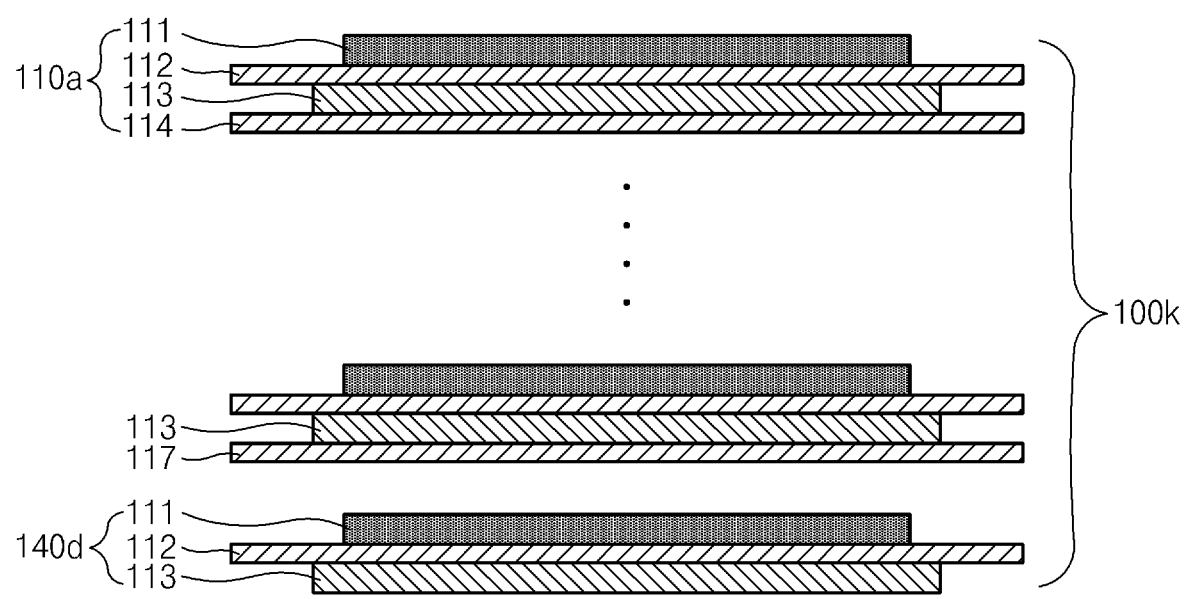
FIG. 18 is a side view illustrating an eighth structure of a cell stack part including a radical unit and a second auxiliary unit according to the present disclosure.

Next, the second auxiliary unit will be described below. As illustrated in FIG. 17, when the electrode 113 contacting the terminal separator 117 is a cathode in the radical unit, the second auxiliary unit 140*c* may be formed as an anode 111. As illustrated in FIG. 18, when the electrode 113 contacting the terminal separator 117 is an anode in the radical unit, the second auxiliary unit 140*d* may be formed by stacking from the terminal separator 117, the cathode 111, the separator 112, and the anode 113 in sequence. In the cell stack parts 100*j* and 100*k*, an anode may be positioned at the outermost portion of the terminal separator through the second auxiliary units 140*c* and 140*d* as illustrated in FIGS. 17 and 18.

Figure 19:
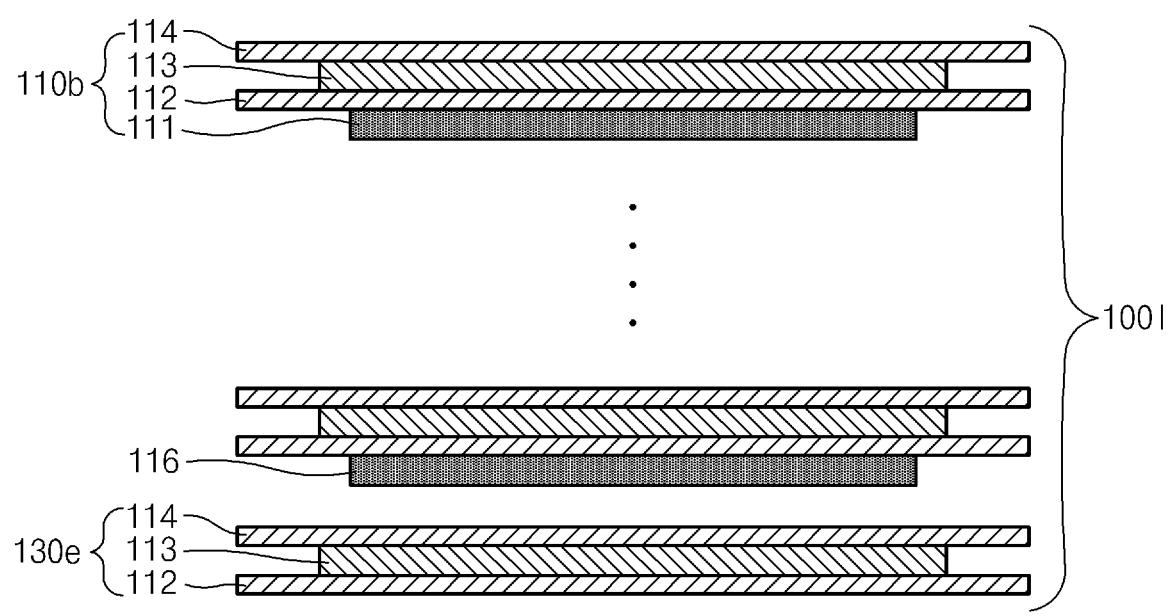
FIG. 19 is a side view illustrating a ninth structure of a cell stack part including a radical unit and a first auxiliary unit according to the present disclosure.

For reference, an anode may make a reaction with an aluminum layer of a battery case (for example, a pouch-type case) due to potential difference. Thus, the anode is preferably insulated from the battery case by means of a separator. For this, the first and second auxiliary units in FIGS. 15 to 18 may further include a separator at the outer portion of the anode. For example, the first auxiliary unit 130*e* in FIG. 19 may further include a separator 112 at the outermost portion thereof when compared with the first auxiliary unit 130*c* in FIG. 15. For reference, when the auxiliary unit includes the separator, the alignment of the auxiliary units in the radical unit may be easily performed.

Figure 20:
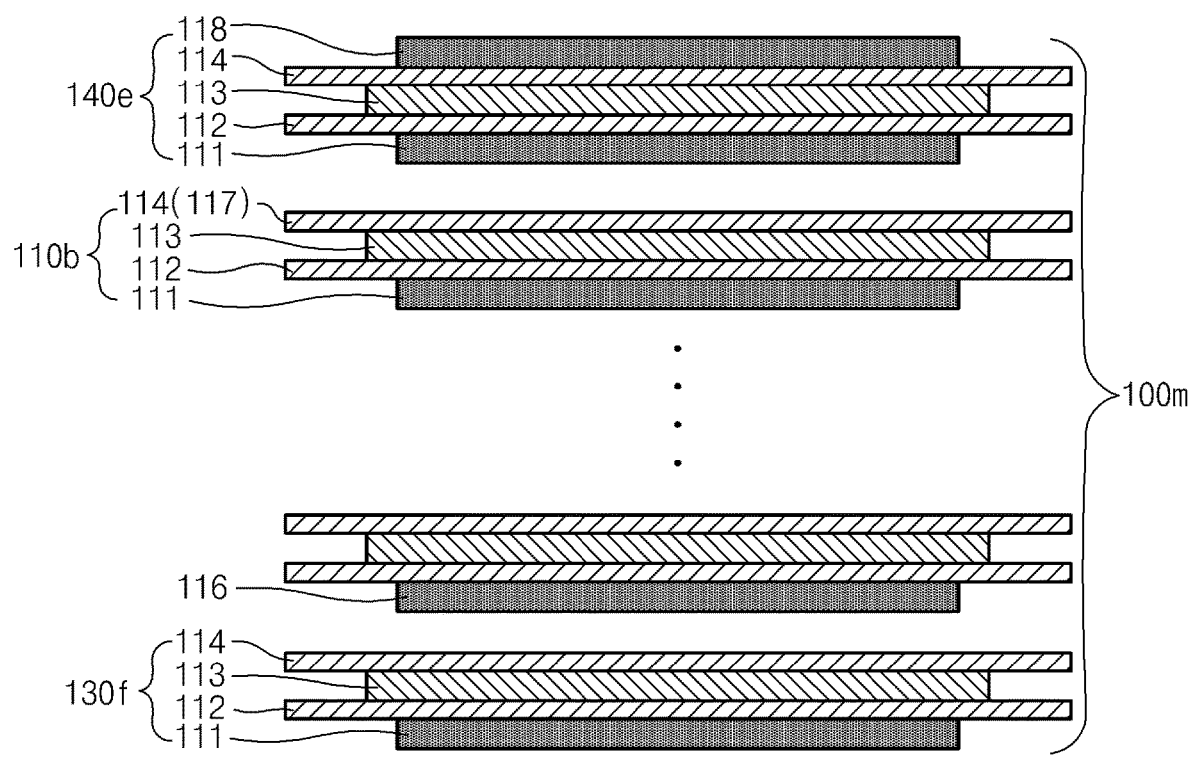
FIG. 20 is a side view illustrating a tenth structure of a cell stack part including a radical unit, a first auxiliary unit, and a second auxiliary unit according to the present disclosure.

A cell stack part 100*m* may be formed as illustrated in FIG. 20. A radical unit 110*b* may be formed by stacking from the lower portion to the upper portion, a first electrode 111, a first separator 112, a second electrode 113, and a second separator 114 in sequence. In this case, the first electrode 111 may be a cathode, and the second electrode 113 may be an anode.

A first auxiliary unit 130*f* may be formed by stacking from the terminal electrode 116, the separator 114, the anode 113, the separator 112 and the cathode 111 in sequence. In this case, in the cathode 111 of the first auxiliary unit 130*f*, only one side of a current collector facing the radical unit 110*b* among both sides of the current collector may be coated with an active material layer.

Also, a second auxiliary unit 140*e* may be formed by stacking from the terminal separator 117, the cathode 111 (the first cathode), the separator 112, the anode 113, the separator 114, and the cathode 118 (the second cathode) in sequence. In this case, in the cathode 118 (the second cathode) of the second auxiliary unit 140*e* positioned at the outermost portion, only one side of a current collector facing the radical unit 110*b* among both sides of the current collector may be coated with an active material layer.

Figure 21:
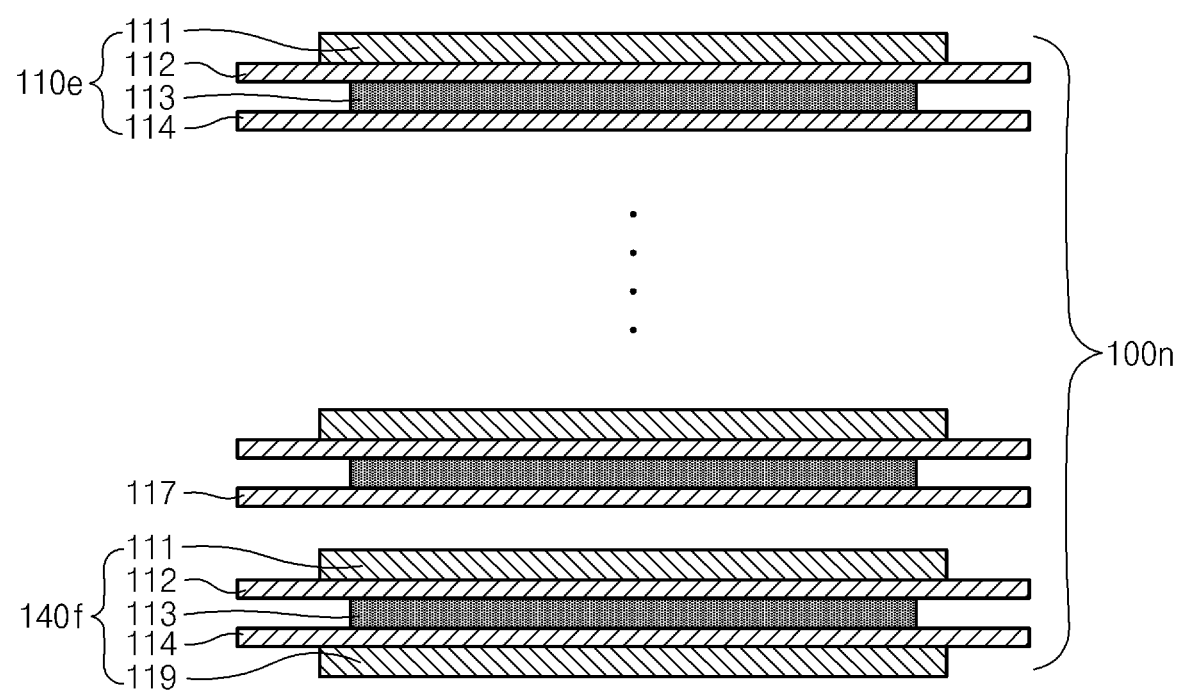
FIG. 21 is a side view illustrating an eleventh structure of a cell stack part including a radical unit and a second auxiliary unit according to the present disclosure.

Finally, a cell stack part 100*n* may be formed as illustrated in FIG. 21. A radical unit 110*e* may be formed by stacking from the upper portion to the lower portion, a first electrode 111, a first separator 112, a second electrode 113, and a second separator 114 in sequence. In this case, the first electrode 111 may be an anode, and the second electrode 113 may be a cathode. Also, a second auxiliary unit 140*f* may be formed by stacking from the terminal separator 117, the anode 111, the separator 112, the cathode 113, the separator 114, and the anode 119 in sequence.

Fixing Part

The electrode assembly of the present disclosure includes a fixing part for fixing the cell stack part. The electrode assembly according to the present disclosure has basic properties in forming the cell stack part (electrode assembly) by only stacking the radical units. However, when the cell stack part is formed by stacking the radical units, gaps may be generated between the radical units. The gaps may also be generated between an electrode and a separator. Due to the generation of the gaps, the electrode assembly may be disassembled. Thus, to secure the stacking stability of the electrode assembly, the prevention of the generation of the gaps is necessary. For this, the electrode assembly of the present disclosure includes a fixing part.

Figure 22:
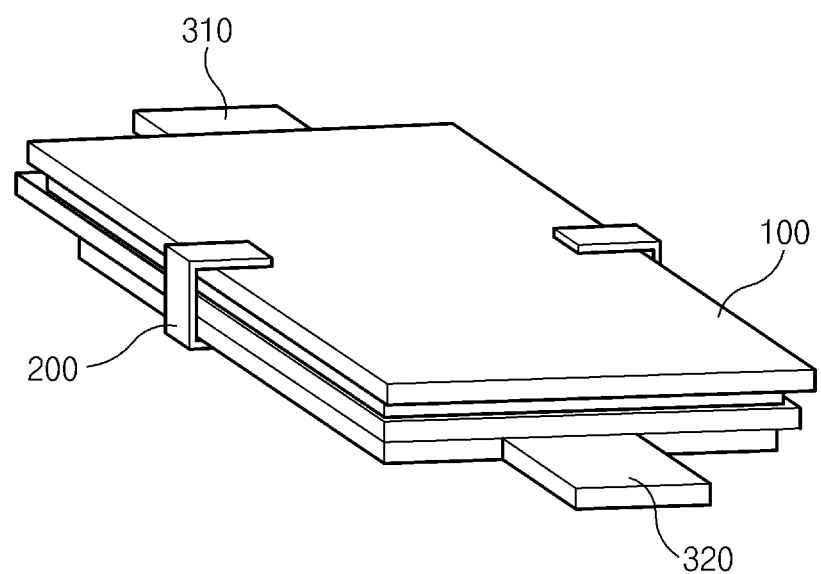
FIG. 22 is a perspective view illustrating an electrode assembly including a fixing part according to an embodiment of the present disclosure.

As illustrated in FIG. 22, a fixing part 200 is extended from the top surface of the cell stack part 100 along the side of the cell stack part 100 to the bottom surface of the cell stack part 100 and fixes the cell stack part 100. Even though the cell stack part includes a plurality of steps as illustrated in FIG. 8, the cell stack part may also be fixed by means of the fixing part. For reference, a cell stack part including one radical unit is illustrated in FIG. 22.

Here, the fixing part 200 preferably fixes the cell stack part 100 by pressing the cell stack part 100 inwardly. Particularly, the cell stack part 100 may be fixed by the following. One end of a polymer tape is fixed to the top surface of the cell stack part 100 by heat welding, and the other end of the polymer tape is drawn along the side of the cell stack part 100 and is heat welded to the bottom surface of the cell stack part 100. Through the procedure, the cell stack part 100 may be fixed by the fixing part 200 more stably.

Meanwhile, electrode terminals or electrode tabs 310 and 320 making electrical connections with electrodes of the cell stack part 100 may be extended in opposite directions from each other according to the polarity as illustrated in FIG. 22. For example, a cathode terminal may be extended frontward, and an anode terminal may be extended rearward. Alternatively, the electrode terminals may be extended in the same direction with a distance between them according to the polarity.

The fixing part 200 may be formed by the process described above (see FIGS. 22 and 23). In this case, two fixing parts 200 in parallel to a first direction D1, which will be explained later, may be provided at the sides of the cell stack part 100 among four sides of the cell stack part 100 as illustrated in FIG. 23.

Figure 23:
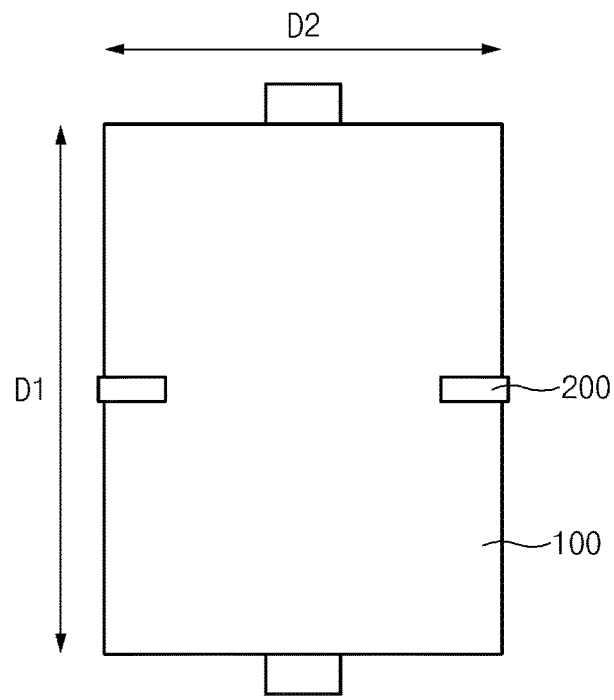
FIG. 23 is a plan view illustrating the electrode assembly in FIG. 22.
Figure 24:
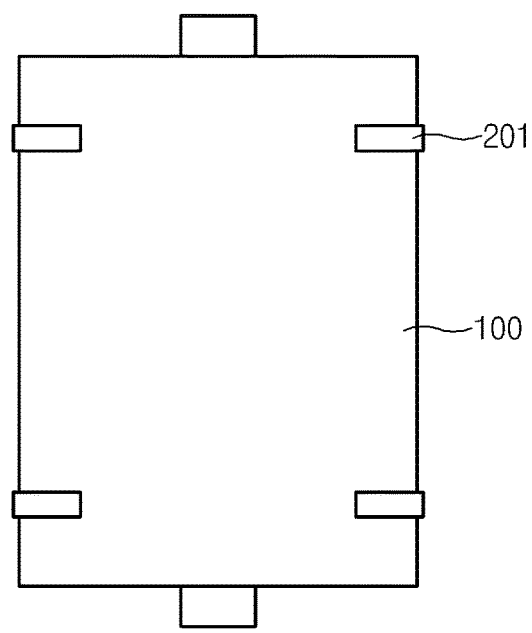
FIGS. 24 and 25 are plan views illustrating first and second modification embodiments of the fixing part in FIG. 23.
Figure 25:
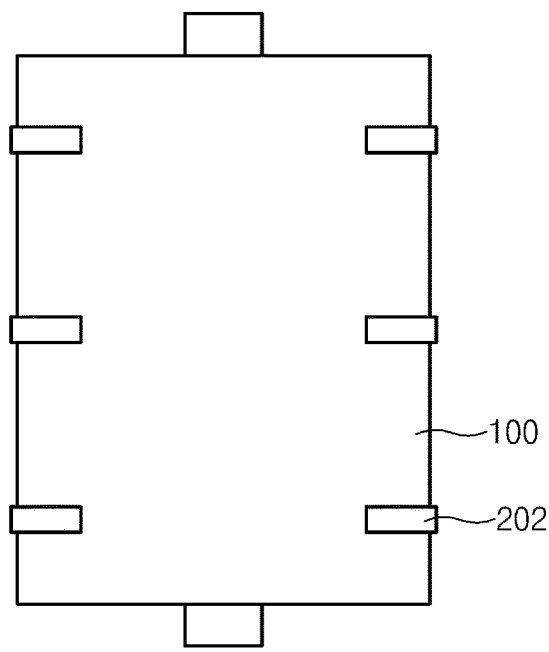
Figure 26:
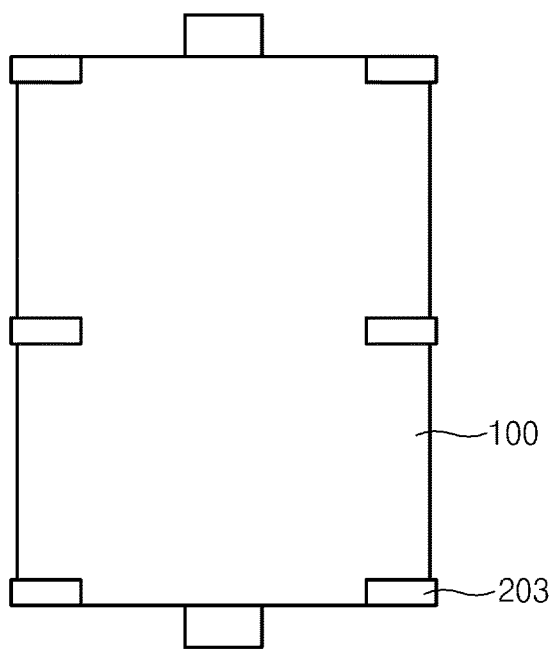
FIG. 26 is a plan view illustrating a third modification embodiment of the fixing part in FIG. 23.

Here, fixing parts 201 and 202 may be provided in plural along the first direction D1 (see FIG. 23) as illustrated in FIG. 24 or 25. (Two fixing parts are provided at the left side along the first direction, and two fixing parts are provided at the right side along the first direction in FIG. 24.) By forming the fixing parts 201 and 202, the generation of gaps at the outer portion of the cell stack part 100 may be effectively prevented. In addition, when a fixing part 203 is formed as illustrated in FIG. 26, the generation of the gaps at the outer portion of the cell stack part 100 may be more effectively prevented.

The first direction D1 may be defined on a plane obtained by projecting the cell stack part 100 in a height direction (up and down in FIG. 22). As illustrated in FIG. 22, the cell stack part 100 in this embodiment has a rectangular shape. (Generally, a separator is the biggest, and the separator will be explained as a reference.) When the cell stack part 100 is projected in the height direction, a rectangle is obtained (see FIG. 23). The rectangle has four sides. Two of them are extended in the first direction D1 and are in parallel to each other, and the remaining two of them are extended in a second direction D2 which is perpendicular to the first direction D1 and are in parallel to each other. The first direction D1 and the second direction D2 may be defined as described above. However, the plane obtained by projecting the cell stack part is not necessary to be a rectangle.

Figure 27:
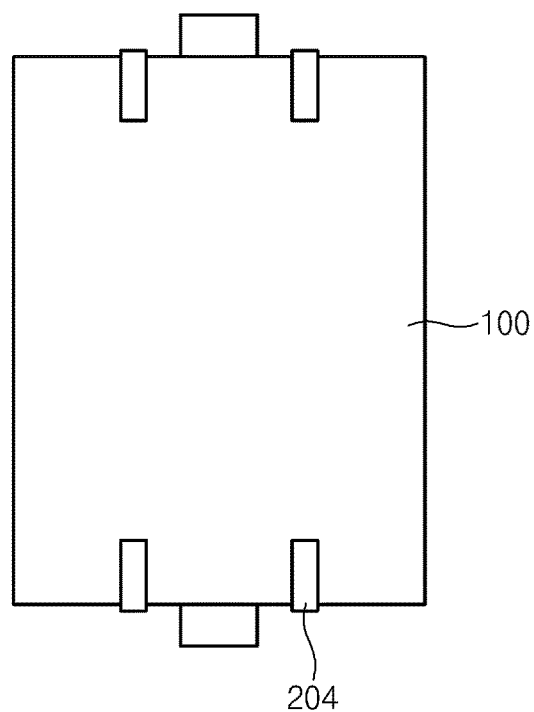
FIG. 27 is a plan view illustrating a fourth modification embodiment of the fixing part in FIG. 23.

Meanwhile, the fixing part 200 in FIG. 23 may be modified as that in FIG. 27. That is, two fixing parts 204 may be provided at the two sides in parallel to the second direction D2 (see FIG. 23) in the cell stack part 100 as illustrated in FIG. 27. Here, a plurality of the fixing parts 204 may be provided along the second direction D2. (Two fixing parts are provided at the upper part along the second direction, and two fixing parts are provided at the bottom part along the second direction in FIG. 27.)

Figure 28:
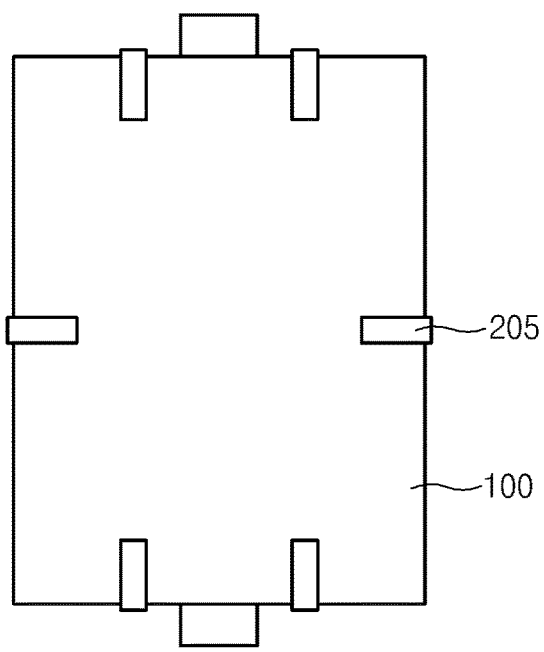
FIG. 28 is a plan view illustrating a fifth modification embodiment of the fixing part in FIG. 23.

As illustrated in FIG. 28, fixing parts 205 may be provided at four sides of the cell stack part 100. For reference, the first direction D1 and the second direction D2 are relative. For example, the upper side and the bottom side of the cell stack part in FIG. 28 may be defined as a direction in parallel to the first direction D1.

Figure 29:
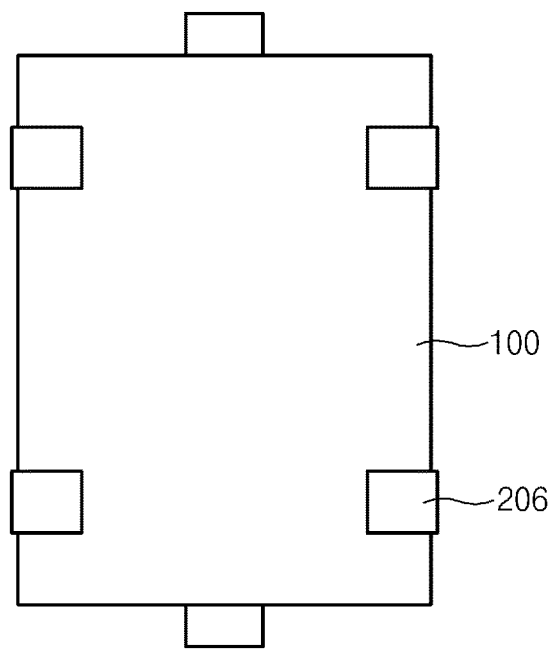
FIGS. 29 and 30 are plan views illustrating sixth and seventh modification embodiments of the fixing part in FIG. 23.
Figure 30:
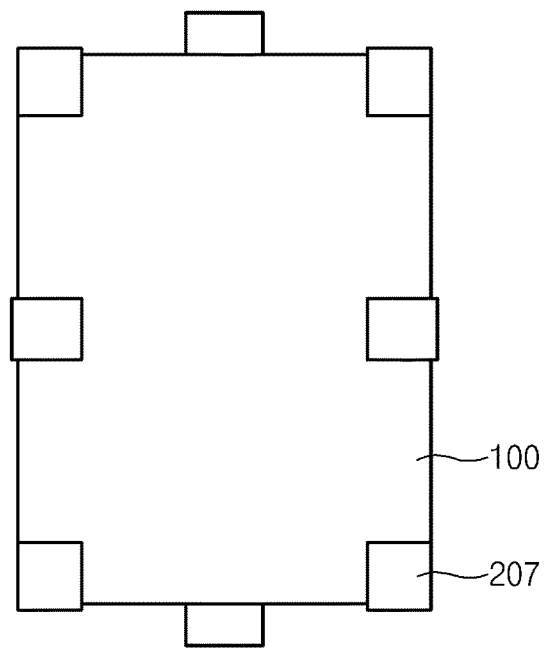

In addition, the thickness of fixing parts 206 and 207 may be changed as illustrated in FIGS. 29 and 30 from that of the fixing part 200 in FIG. 23. When the thickness of the fixing parts 206 and 207 is increased as illustrated in FIGS. 29 and 30, the cell stack part 100 may be fixed more stably. For reference, the fixing parts 207 are provided at all sides of the cell stack part 100 in FIG. 30.

Figure 31:
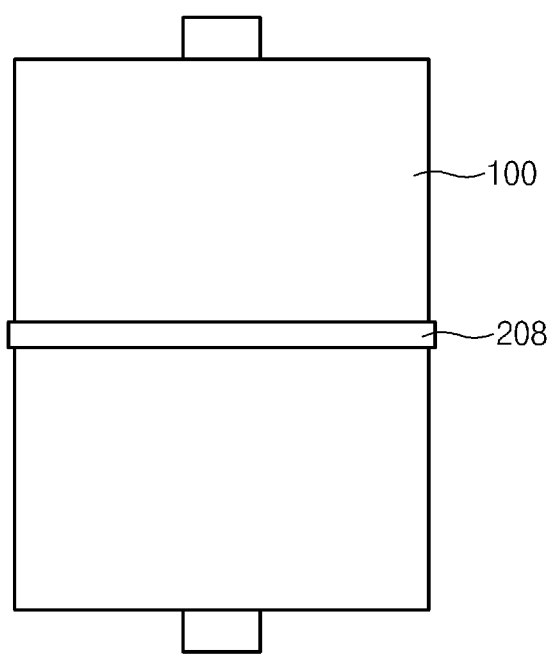
FIG. 31 is a plan view illustrating an eighth modification embodiment of the fixing part in FIG. 23.
Figure 32:
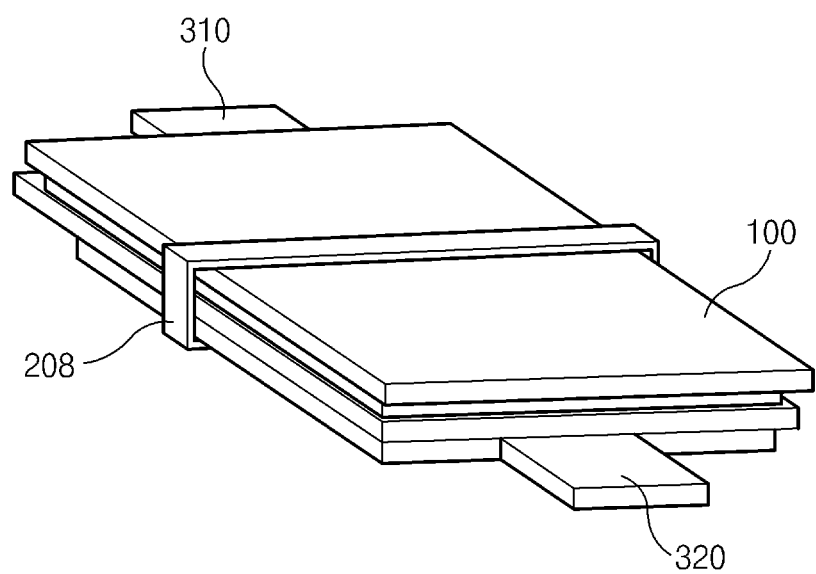
FIG. 32 is a perspective view illustrating the electrode assembly in FIG. 31.

Meanwhile, the cell stack part 100 may be wrapped in a fixing part 208 by at least one lap in a direction in parallel to the second direction D2 as illustrated in FIGS. 31 and 32. That is, after extending the fixing part 208 from the top surface of the cell stack part 100 along the side of the cell stack part 100 to the bottom surface of the cell stack part 100, the fixing part 208 may be extended from the bottom surface of the cell stack part 100 along the other side of the cell stack part 100 to the top surface of the cell stack part 100. By forming the fixing part 208 as described above, the cell stack part 100 may be fixed more stably when compared to the fixing using the fixing part 200 as in FIG. 23.

For reference, the length of the fixing part 200 in FIG. 23 is shorter when compared to that of the fixing part 208 in FIG. 31. Thus, the unit price of an electrode assembly may decrease when using the fixing part 200 in FIG. 23. In addition, the thickness of an electrode assembly may decrease when the fixing part 200 in FIG. 23 is formed when compared to the fixing part 208 in FIG. 31. In the fixing part 200 in FIG. 23, the fixing part 200 is not formed at the center portion of the top surface and the bottom surface of the cell stack part 100. However, in the fixing part 208 in FIG. 31, the fixing part 208 is formed at the center portion of the top surface and the bottom surface of the cell stack part 100.

Figure 33:
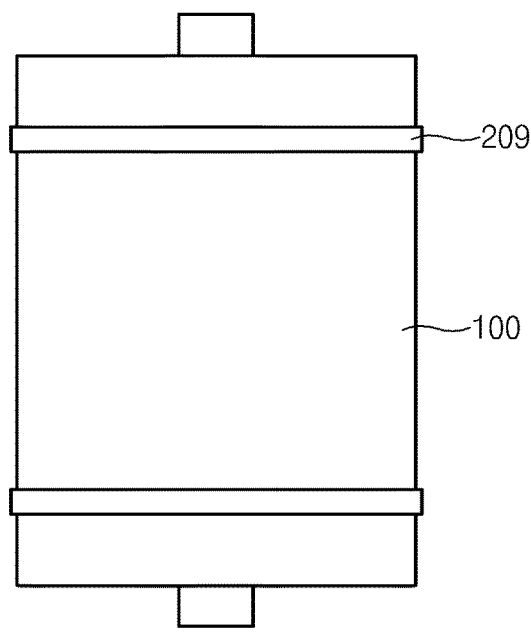
FIGS. 33 and 34 are plan views illustrating first and second modification embodiments of the fixing part in FIG. 31.
Figure 34:
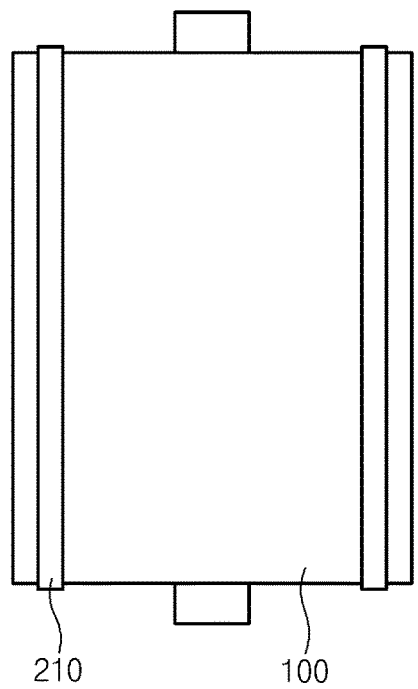

The fixing part 208 in FIG. 31 may be modified as in FIG. 33 or 34. That is, a plurality of fixing parts 209 may be provided in the first direction D1 as illustrated in FIG. 33. Alternatively, the fixing part 210 may wrap the cell stack part 100 by one lap or more than two laps in a direction in parallel to the first direction D1 as illustrated in FIG. 34. In this case, a plurality of the fixing parts 210 may be provided in the second direction D2.

The invention claimed is:
1. An electrode assembly, comprising:
a cell stack part having (a) a structure in which one kind of radical unit is repeatedly disposed such that one of the one kind of radical unit is in direct contact with another one of the one kind of radical unit, the one kind of radical unit having a same number of electrodes and separators which are alternately disposed and integrally combined, or (b) a structure in which at least two kinds of radical units are disposed in a predetermined order such that one of the at least two kinds of radical units is in direct contact with another of the at least two kinds of radical units, the at least two kinds of radical units each having a same number of electrodes and separators which are alternately disposed and integrally combined;
a first fixing part and a second fixing part, each extending from a top surface of the cell stack part to a bottom surface of the cell stack part around an upper side edge of the cell stack part from which a first electrode terminal is extended for fixing the cell stack part;
a third fixing part and a fourth fixing part, each extending from the top surface of the cell stack part to the bottom surface of the cell stack part around an lower side edge of the cell stack part from which a second electrode terminal is extended for fixing the cells stack part; and
a fifth fixing part and a sixth fixing part that wrap the cell stack part by at least one full lap in a direction perpendicular to the first to fourth fixing parts,
wherein each of the first to sixth fixing parts is directly attached to an outermost separator of the cell stack part of an outermost cathode current collector of the cell stack part, the outermost separator abutting at most one electrode,
wherein all of the first to sixth fixing parts are made of a same material,
wherein the one kind of radical unit of (a) has a four-layered structure in which a first electrode, a first separator, a second electrode and a second separator are sequentially stacked together or a repeating structure in which the four-layered structure is repeatedly stacked,
wherein each of the at least two kinds of radical units of (b) are stacked by ones in the predetermined order to form the four-layered structure or the repeating structure in which the four-layered structure is repeatedly stacked, wherein the first separator and the second separator comprise a coating layer having adhesive strength on one side or both sides of the first separator and the second separator, and wherein adhesive strength between the electrode and the adjacent separator in the radical unit is greater than adhesive strength between the radical units in the cell stack part.

2. The electrode assembly of claim 1, wherein edges of adjacent separators are not joined with each other.

3. The electrode assembly of claim 1, wherein each of the first to sixth fixing parts fixes the cell stack part by pressing the cell stack part inwardly.

4. The electrode assembly of claim 1, wherein each of the first to sixth fixing parts comprises a polymer tape.

5. The electrode assembly of claim 1, wherein the one kind of radical unit of (a) comprises a first radical unit having the four-layered structure or the repeating structure in which the four-layered structure is repeatedly stacked, and wherein the cell stack part has a structure in which the first radical units are repeatedly disposed.

6. The electrode assembly of claim 1, wherein the at least two kinds of radical units of (b) comprises:

a second radical unit having the first electrode, the first separator, the second electrode, the second separator, the first electrode, and the first separator, which are sequentially disposed and integrally combined; and a third radical unit having the second electrode, the second separator, the first electrode, the first separator, the second electrode, and the second separator, which are sequentially disposed and integrally combined, and wherein the cell stack part has a structure in which the second radical unit and the third radical unit are alternately disposed.

7. The electrode assembly of claim 1, wherein the one kind of radical unit of (a) is provided in plurality and the plurality of one kind of radical units is classified into at least two groups having different sizes, and wherein the cell stack part has a structure in which a plurality of steps is formed by stacking the one kind of radical units of (a) according to the size thereof.

8. The electrode assembly of claim 1, wherein the one kind of radical unit of (a) is provided in plurality and the plurality of the one kind of radical units is classified into at least two groups having different geometric shapes, and wherein the cell stack part has a structure in which a plurality of steps is formed by stacking the one kind of radical units of (a) according to the geometric shape thereof.

9. The electrode assembly of claim 1, wherein the electrode is attached to an adjacent separator in each radical unit.

10. The electrode assembly of claim 1, wherein the cell stack part further comprises a second auxiliary unit on a terminal separator that is an uppermost or a lowermost separator, wherein, when the electrode contacting the terminal separator is a cathode in the radical unit, the second auxiliary unit is formed by stacking from the terminal separator, an anode, a separator and a cathode in sequence, and wherein, when the electrode contacting the terminal separator is an anode in the radical unit, the second auxiliary unit is formed as a cathode.

11. The electrode assembly of claim 1, wherein the cell stack part further comprises a second auxiliary unit on a terminal separator that is an uppermost or a lowermost separator, wherein, when the electrode contacting the terminal separator is a cathode in the radical unit, the second auxiliary unit is formed as an anode and a separator, and wherein, when the electrode contacting the terminal separator is an anode in the radical unit, the second auxiliary unit is formed by stacking from the terminal separator, a cathode, a separator, an anode, and a separator in sequence.

12. The electrode assembly of claim 1, wherein the cell stack part further comprises a first auxiliary unit stacked on a terminal electrode that is an uppermost or a lowermost electrode, wherein, when the terminal electrode is a cathode, the first auxiliary unit is formed by stacking from the terminal electrode, a separator, an anode, a separator, and a cathode in sequence, and wherein, when the terminal electrode is an anode, the first auxiliary unit is formed by stacking from the terminal electrode, a separator, and a cathode in sequence.

13. The electrode assembly of claim 1, wherein the cell stack part further comprises a first auxiliary unit stacked on a terminal electrode that is an uppermost or a lowermost electrode, wherein, when the terminal electrode is a cathode, the first auxiliary unit is formed by stacking from the terminal electrode, a separator, an anode, and a separator in sequence, and wherein, when the terminal electrode is an anode, the first auxiliary unit is formed by stacking from the terminal electrode, a separator, a cathode, a separator, an anode, and a separator in sequence.

* * * * *